Sept. 20, 1966     D. M. BOYD, JR     3,274,583
PULSE RATE CONTROLLER

Filed Nov. 6, 1961     3 Sheets-Sheet 1

INVENTOR
David M. Boyd Jr.

BY: *Chester J. Giuliani*
*Philip J. Liggett*
ATTORNEYS

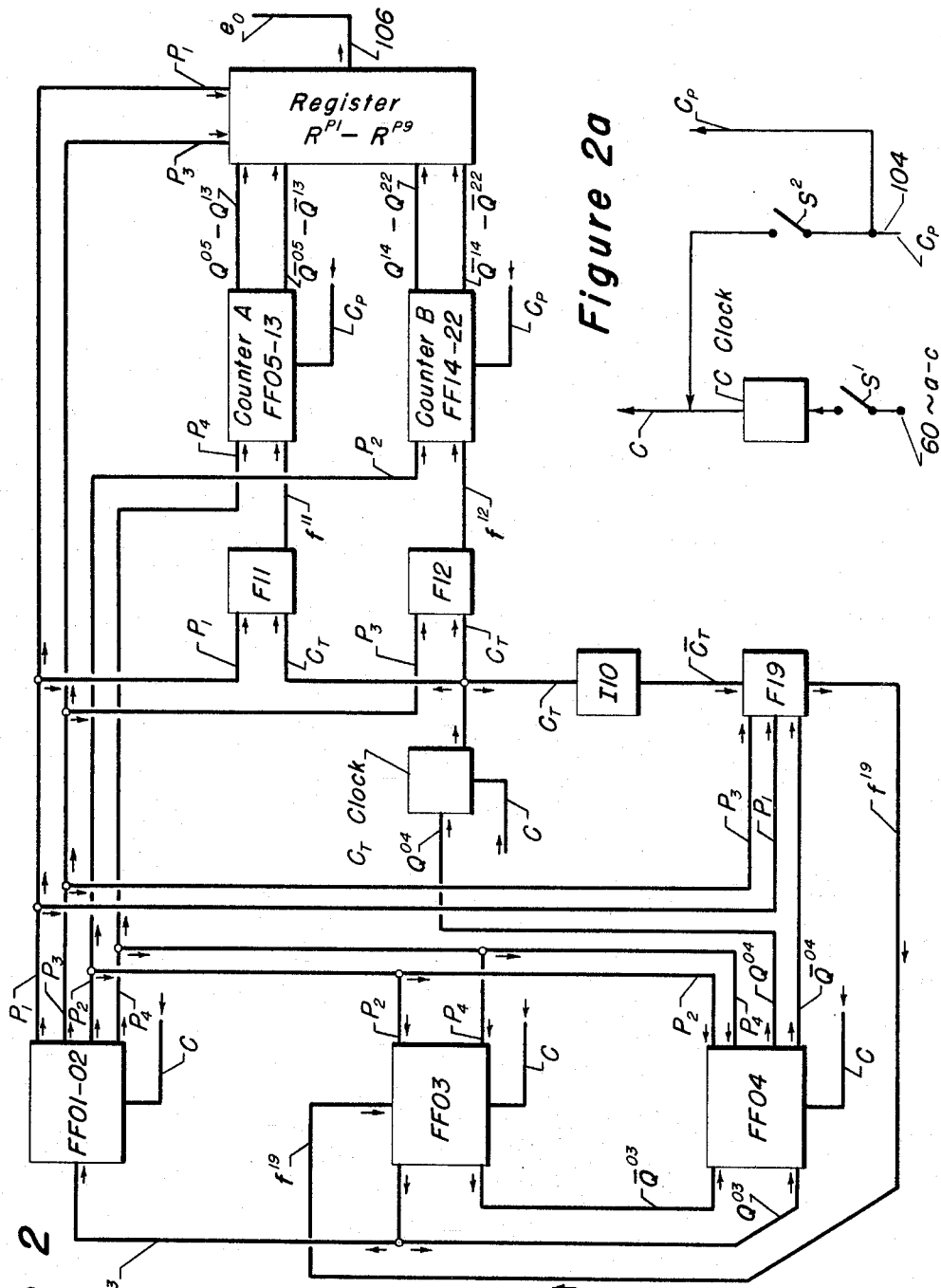

United States Patent Office 3,274,583
Patented Sept. 20, 1966

3,274,583
PULSE RATE CONTROLLER
David M. Boyd, Jr., Clarendon Hills, Ill., assignor to Universal Oil Products Company, Des Plaines, Ill., a corporation of Delaware
Filed Nov. 6, 1961, Ser. No. 150,436
7 Claims. (Cl. 340—347)

This invention relates to apparatus for controlling the pulse rate of a variable frequency pulse source which is characterized in that such frequency is responsive to an analog control signal. More particularly, the present invention is directed to a digital flow controller for regulating the flow of a fluid in response to pulse rate information such as is obtained from a turbine flowmeter.

The use of turbine flowmeters is becoming widespread in the petroleum, petrochemical and chemical process industries. A turbine flowmeter, as is well known, comprises a magnetic rotor element which is in direct contact with and rotated by the fluid being monitored and is surrounded by a stator winding physically isolated from the fluid. Its output is taken from the stator winding and consists of a pulse train the frequency of which, over a limited range, is proportional to the volumetric flow rate of the fluid passing therethrough. Its output is relatively insensitive to specific gravity or temperature changes. The advantages of the turbine flowmeter include high accuracy and good linearity which renders it ideally suited for use in fluid proportioning, blending and totalizing systems.

Heretofore the actual flow control of a fluid stream, as distinguished from the monitoring or recording function provided by the turbine flowmeter, has been effected by a separate all-analog flow control loop comprising, for example, an orifice-type force balance flow transmitter and a conventional analog controller. The result is a duplication of primary measuring elements, one being a highly accurate, linear digital flowmeter used in performing the totalizing function and the other an analog, non-linear flowmeter of somewhat lower accuracy used in performing the control function.

It is an object of the present invention to provide a pulse rate controller which utilizes as its input information a variable frequency pulse train obtained directly from a turbine flowmeter of the class described, thereby obviating the need for a second analog flow transmitter and allowing both the flow totalizing and flow control functions to be implemented by means of a single primary measuring element.

It is a further object of this invention to provide novel control apparatus which combines the dual operations of pulse rate conversion and setpoint address in a unitary integrated circuit, thereby eliminating the necessity for an expensive digital-to-analog converter which would otherwise be required as an intermediate component between the turbine flowmeter and the flow controller proper.

In one embodiment, this invention relates to apparatus for controlling the pulse rate of a variable frequency pulse source, said frequency being responsive to an analog control signal, which comprises in combination: a counter receiving said variable frequency pulses, variable time gating means enabling said counter to count during a predetermined adjustable interval, register input means, register means receiving through said input means the total count arrived at by said counter upon completion of said counting interval and producing an analog register signal proportional to said count, programming means alternately activating said variable time gating means and said register input means, and an integrating amplifier receiving said register signal and producing as its output signal said analog control signal.

In another embodiment of this invention, the circuitry herein provided comprises first and second counters each receiving variable frequency pulses, first and second variable time gates each enabling a respective one of said counters to count during a predetermined adjustable interval, a register means, first and second groups of readout gates each transferring the total count arrived at by a respective one of said counters to said register means, said register means producing an analog register signal proportional to said count, programming means activating said first time gate and said second group of readout gates and then activating said second time gate and said first group of readout gates in repetitive alternating relationship, and an integrating amplifier receiving said register signal and producing an analog output signal which may then be transmitted directly to a flow control valve or other final control element.

As noted above, the present invention comprises a digital logic section including a counting circuit, a time gate and an output register, and an integrating amplifier receiving a signal from the output register. The counting circuit counts the flowmeter pulses only during the interval—which is adjustable—that the time gate is activated. Upon completion of the counting period, the count is transferred to the output register, the counter is then cleared and a new counting cycle is commenced. The register applies an analog signal, whose magnitude is proportional to the count just previously reached, to the summing point of the integrating amplifier which also receives a constant reference or biasing voltage. The output of the amplifier will continuously change, in an increasing or decreasing direction, whenever the register signal differs from the reference voltage and would ultimately drive to saturation at either end of its output range were it not for the negative feedback characteristic of the flow control loop; that is, the output signal from the integrating amplifier is employed to actuate a flow control valve or other final control element in such a manner as will tend to restore the magnitude of the register signal to that of the reference voltage. For a given time gating interval, the register signal is proportional to the time integral of the instantaneous fluid flow rate during such gating interval. If the sampled flow rate is too low, the register signal will be less than the amplifier reference voltage, and the amplifier output will then change in such direction as will increase the flow rate; conversely, if the sampled flow rate is too high, the register signal will be greater than the amplifier reference voltage, and the amplifier output will change in such direction as will decrease the flow rate. The sampling frequency is considerably higher than the reciprocal of the time required for the integrating amplifier to drive to saturation, so that overall closed loop stability is assured. The setpoint of the flow control loop is changed simply by adjusting the time gating interval. To increase the flow rate, the time gating interval is reduced so that a higher pulse rate, and therefore a higher flow rate, must result in order that the register signal may come into balance with the amplifier reference voltage; to decrease the flow rate, the time gating interval is increased so that a lower pulse rate, and therefore a lower flow rate, must result in order that the register signal may come into balance with the amplifier reference voltage.

The circuitry of this invention is designed so that it may be constructed largely of solid state components which provide superior reliability and substantially maintenance-free operation under the demands of heavy duty service encountered in the typical petroleum refinery or chemical plant.

The several embodiments of the invention and modifications incident thereto may best be described in conjunction with the accompanying drawings which are presented as illustrative of the best mode of practicing the invention but not with the intention of unduly limiting its broad scope.

FIGURE 2 is a signal flow diagram of one embodiment of the digital logic section utilizing dual counters.

FIGURE 2a illustrates the clock pulse source and flowmeter pulse input system for the logic section.

Figure 1:
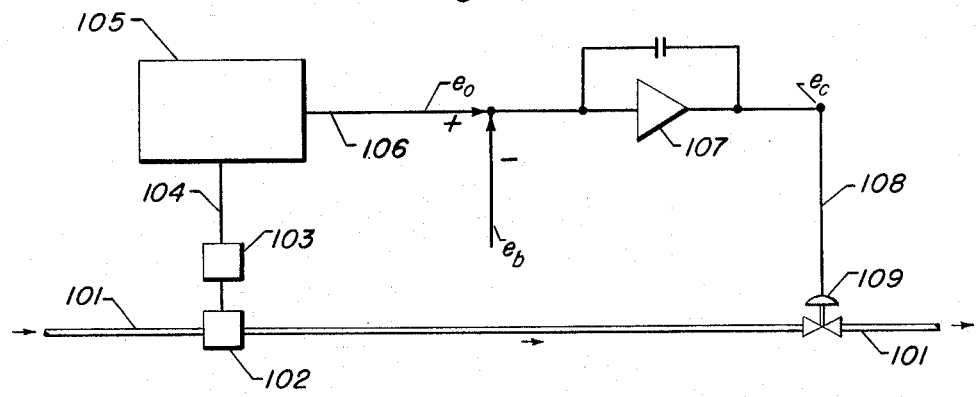
FIG. 1 is a process flow and signal flow diagram indicating the major functional components of the complete flow control loop.

With reference now to FIGURE 1, there is shown a fluid-conducting line 101, a turbine flowmeter 102 and a motor valve 109. The frequency of the pulse output of flowmeter 102 is responsive to the degree of opening of valve 109. The pulse train is passed through a pulse-shaping network indicated diagrammatically as box 103 and which may comprise a squaring amplifier driving an RC differentiator to produce a spike waveform. The resulting shaped pulses are then passed by line 104 to the digital logic section, indicated diagrammatically as box 105, the details of which will be described later in connection with FIGURES 2, 2a, 3 and 4. The register output signal is a voltage $e_0$ which is proportional to the time integral of the fluid flow rate during the immediately preceding sampling interval, or equivalently, to the product of counting time and average pulse rate during such counting time. Signal $e_0$ and bias signal $e_b$ of opposite polarity are applied to the input circuit of integrating amplifier 107. The amplifier output signal $e_c$ is transmitted by line 108 to motor valve 109 which may include an electro-pneumatic or electro-hydraulic valve positioner. As indicated, bias signal $e_b$ is negative so that the amplifier output signal $e_c$ is given by:

$$e_c = \int (e_0 - e_b) dt$$

In this case, $e_c$ will increase when $e_0$ is greater than $e_b$, and conversely, so that the final control element must be reverse-acting, e.g., motor valve 109 should be a spring-opening or signal-to-close valve, in order to obtain the requisite closed loop negative feedback. Quite obviously, the polarity of input signals $e_0$ and $e_b$ may be reversed so that the amplifier output signal is then given by:

$$e_c = \int (e_b - e_0) dt$$

In such latter case, $e_c$ will decrease when $e_0$ is greater than $e_b$, and conversely, so that the final control element must be direct-acting, e.g., motor valve 109 should be a spring-closing or signal-to-close valve, in order to obtain the requisite closed loop negative feedback. In either case, the net control action is such as to maintain signal $e_0$ substantially equal to signal $e_b$. If the sampling or counting interval should be reduced $e_0$ will temporarily decrease from its previous level end $e_c$ will then change in such direction as to increase the flow rate and flowmeter pulse frequency and restore $e_0$ to its previous level which equals $e_b$. On the other hand, if the sampling or counting interval should be increased, $e_0$ will temporarily increase from its previous level and $e_c$ will then change in such direction as to decrease the flow rate and flowmeter pulse frequency and restore $e_0$ to its previous level which equals $e_b$. For a given sampling interval, an outside process disturbance which would tend to change the controlled flow rate will be compensated for in like manner.

FIGURE 2 is a schematic signal flow diagram of the circuitry contained within block 105 of FIGURE 1. Only the major functional components thereof are shown, inasmuch as these are assembled from standard, commercially available circuits such as flip-flops, diode AND gates, diode OR gates, transistor inverter gates, power gates, buffer amplifiers, digital clocks, relay matrices and the like; the design of these subcomponents is well known to those skilled in the computer art and forms no part of the present invention. The interconnections between the subcomponents to form the major functional components are made in accordance with the logic equations hereinafter set forth, and the interconnections between the major components are made according to the signal flow diagram of FIGURE 2.

It will be desirable at this point to define several of these symbols employed in the following logic equations; J and K represent, respectively, the "true" and "false" inputs of a flip-flop (FF), while Q and $\overline{Q}$ represent, respectively, the "true" and "false" outputs of the flip-flop; a signal present on the J input terminal coupled with a clock pulse (C) places the flip-flop in its true or "up" state by activating the Q output terminal until such time as the flip-flop is tripped to its false or "down" state; a signal present on the K input terminal, coupled with a clock pulse (C), places the flip-flop in its down state by activating the $\overline{Q}$ output terminal until such time as the flip-flop should again be tripped to its up state. Q and $\overline{Q}$ cannot, of course, exist simultaneously in the same flip-flop.

AND and OR functions are represented as follows: $Q^{01} \ Q^{02} \ Q^{03}$ means $Q^{01}$ and $Q^{02}$ and $Q^{03}$, whereas $Q^{01} + Q^{02} + Q^{03}$ means $Q^{01}$ or $Q^{02}$ or $Q^{03}$. The "plus" sign as employed in the computer logic equations connotes a logical OR function. A typical logic equation such as, for example, $$J^{04} = Q^{03}\overline{Q}^{04}(P_2 + P_4)C$$

is interpreted to mean that $J^{04}$ is true (and therefore flip-flop FF04 is set "up" to $Q^{04}$ upon receiving the next clock pulse C) if $Q^{03}$ is true and $Q^{04}$ is false and either $P_2$ or $P_4$ is true. Other symbols will be defined as they appear in the logic equations.

Turning now to FIGURE 2, the programming means of the digital logic section includes a program counter which comprises two flip-flops FF01 and FF02 and four logical followers (logic gates plus buffer amplifiers) $P_1$, $P_2$, $P_3$ and $P_4$, a program counter enabling flip-flop FF03 and a time gate enabling flip-flop FF04. Flip-flops FF01, –02, –03, –04 are driven by clock pulses C from the C clock whose excitation may be obtained from any suitable source and which will be described more fully in connection with FIGURE 2a.

A pair of counters—counter A and counter B—each receive flowmeter pulses $C_p$ from line 104 and are controlled by the programming means such that each counts during alternate periods while the other counter is being read out to the register.

The program counter controls the steps involved in counting into, reading out and clearing both counters A and B. The logic equations for program counter FF01–02 are given by:

$$J^{01} = \overline{Q}^{01}Q^{03}C$$
$$K^{01} = Q^{01}Q^{03}C$$

$$J^{02} = Q^{01}\overline{Q}^{02}Q^{03}C$$
$$K^{02} = Q^{01}Q^{02}Q^{03}C$$
$$P_1 = \overline{Q}^{01}\overline{Q}^{02}$$
$$P_2 = Q^{01}\overline{Q}^{02}$$
$$P_3 = \overline{Q}^{01}Q^{02}$$
$$P_4 = Q^{01}Q^{02}$$

Signal $Q^{03}$ is obtained from program counter enabling flip-flop FF03. As long as $Q^{03}$ exists, successive clock pulses C will step the program counter successively through its four configurations $P_1 \ldots P_4$; however, if $\overline{Q}^{03}$ exists, the program counter is locked in a given configuration. The functions of the four configurations of the program counter are given in Table I.

TABLE I

Configuration:                  Function
$P_1$ -- Count into Counter A and read out Counter B.
$P_2$ -- Clear Counter B.
$P_3$ -- Count into Counter B and read out Counter A.
$P_4$ -- Clear Counter A.

Program counter enabling flip-flop FF03 determines in which configurations the program counter will be locked. The logic equations therefor are given by:

$$J^{03} = f^{19}\overline{Q}^{03}C$$
$$K^{03} = (P_2Q^{03} + P_4Q^{03})C$$

Signal $f^{19}$ is a reset signal obtained from reset gate F19 signifying completion of a counting interval for either counter A or counter B. Signal $f^{19}$ plus a clock pulse sets FF03 to $Q^{03}$ which in turn allows the program counter to proceed to the next configuration upon receiving the second clock pulse thereafter. Inspection of the $K^{03}$ logic shows that FF03 will be set down to $\overline{Q}^{03}$ on the same clock pulse which steps the program counter from $P_4$ to $P_1$, and again on the same clock pulse which steps the program counter from $P_2$ to $P_3$; the program counter will therefore be locked in configurations $P_1$ and $P_3$, to permit a count of flowmeter pulses $C_p$ into counters A and B respectively as required by Table I.

Time gate enabling flip-flop FF04 provides a signal $Q^{04}$ which readies the $C_t$ clock for generation of an adjustable duration pulse $C_t$ upon receiving the next clock pulse C and also provides a signal $\overline{Q}^{04}$ which prepares reset gate F19 for activation. The FF04 logic is given by:

$$J^{04} = Q^{03}\overline{Q}^{04}(P_2 + P_4)C$$
$$K^{04} = \overline{Q}^{03}Q^{04}C$$

It will be observed that FF04 is set up to $Q^{04}$ by the same clock pulse which sets FF03 down to $\overline{Q}^{03}$. The next clock pulse thereafter returns FF04 to $\overline{Q}^{04}$.

The $C_t$ clock is a univibrator or "one-shot" amplifier which provides a counter enabling pulse $C_t$ of adjustable time duration. The duration of pulse $C_t$ is controlled by varying a resistor and/or capacitor in its output circuit whereby to change its RC time constant; this is the means of establishing or varying the set-point of the flow control loop. The logic for the $C_t$ clock is given by:

$$C_t = Q^{04}C$$

The same clock pulse C which sets FF04 down to $\overline{Q}^{04}$ also triggers a single $C_t$ pulse; immediately succeeding clock pulses C will not trigger additional $C_t$ pulses since $Q^{04}$ no longer exists during the remainder of the particular counting interval. The duration of the $C_t$ pulse is independent of the C clock frequency and is determined solely by adjustable circuit parameters of the $C_t$ clock.

Time gates F11 and F12 permit counters A and B, respectively, to count flowmeter pulses $C_p$. The logic equations therefor are given by:

$$f^{11} = P_1C_t$$
$$f^{12} = P_3C_t$$

Counter A is a binary counter comprising nine flip-flops FF05–13 and counter B is also a binary counter comprising nine flip-flops FF14–22. It will be obvious to those skilled in the computer art that other types of counters such as an octal counter, decade counter and the like, may be utilized if desired. The logic for counters A and B is given by:

Counter A $$J^{05} = f^{11}\overline{Q}^{05}C_p$$
$$K^{05} = (f^{11}Q^{05} + P_4)C_p$$
$$J^{06} = f^{11}Q^{05}\overline{Q}^{06}C_p$$
$$K^{06} = (f^{11}Q^{05}Q^{06} + P_4)C_p$$
$$J^{07} = f^{11}Q^{05}Q^{06}\overline{Q}^{07}C_p$$
$$K^{07} = (f^{15} + P_4)C_p$$
$$J^{08} = f^{15}\overline{Q}^{08}C_p$$
$$K^{08} = (f^{15}Q^{08} + P_4)C_p$$
$$J^{09} = f^{15}Q^{08}\overline{Q}^{09}C_p$$
$$K^{09} = (f^{15}Q^{08}Q^{09} + P_4)C_p$$
$$J^{10} = f^{15}Q^{08}Q^{09}\overline{Q}^{10}C_p$$
$$K^{10} = (f^{16} + P_4)C_p$$
$$J^{11} = f^{16}\overline{Q}^{11}C_p$$
$$K^{11} = (f^{16}Q^{11} + P_4)C_p$$
$$J^{12} = f^{16}Q^{11}\overline{Q}^{12}C_p$$
$$K^{12} = (f^{16}Q^{11}Q^{12} + P_4)C_p$$
$$J^{13} = f^{16}Q^{11}Q^{12}\overline{Q}^{13}C_p$$
$$K^{13} = (f^{16}Q^{11}Q^{12}Q^{13} + P_4)C_p$$

Signals $f^{15}$ and $f^{16}$ are obtained from logical followers F15 and F16 used in the reduction of counter logic:

$$f^{15} = f^{11}Q^{05}Q^{06}Q^{07}$$
$$f^{16} = f^{11}Q^{05}Q^{06}Q^{07}Q^{08}Q^{09}Q^{10}$$

Counter B $$J^{14} = f^{12}\overline{Q}^{14}C_p$$
$$K^{14} = (f^{12}Q^{14} + P_2)C_p$$
$$J^{15} = f^{12}Q^{14}\overline{Q}^{15}C_p$$
$$K^{15} = (f^{12}Q^{14}Q^{15} + P_2)C_p$$
$$J^{16} = f^{12}Q^{14}Q^{15}\overline{Q}^{16}C_p$$
$$K^{16} = (f^{17} + P_2)C_p$$
$$J^{17} = f^{17}\overline{Q}^{17}C_p$$
$$K^{17} = (f^{17}Q^{17} + P_2)C_p$$
$$J^{18} = f^{17}Q^{17}\overline{Q}^{18}C_p$$
$$K^{18} = (f^{17}Q^{17}Q^{18} + P_2)C_p$$
$$J^{19} = f^{17}Q^{17}Q^{18}\overline{Q}^{19}C_p$$
$$K^{19} = (f^{18} + P_2)C_p$$
$$J^{20} = f^{18}\overline{Q}^{20}C_p$$
$$K^{20} = (f^{18}Q^{20} + P_2)C_p$$
$$J^{21} = f^{18}Q^{20}\overline{Q}^{21}C_p$$
$$K^{21} = (f^{18}Q^{20}Q^{21} + P_2)C_p$$
$$J^{22} = f^{18}Q^{20}Q^{21}\overline{Q}^{22}C_p$$
$$K^{22} = (f^{18}Q^{20}Q^{21}Q^{22} + P_2)C_p$$

Signals $f^{17}$ and $f^{18}$ are obtained from logical followers F17 and F18 used in the reduction of counter logic:

$$f^{17} = f^{12}Q^{14}Q^{15}Q^{16}$$
$$f^{18} = f^{12}Q^{14}Q^{15}Q^{16}Q^{17}Q^{18}Q^{19}$$

Signal $P_4$ plus a flowmeter pulse $C_p$ resets counter A to $\overline{Q}^{05}\overline{Q}^{06} \ldots \overline{Q}^{13}$; signal $P_2$ plus a flowmeter pulse $C_p$ resets counter B to $\overline{Q}^{14}\overline{Q}^{15} \ldots \overline{Q}^{22}$. The counters when thus cleared are prepared to receive the next flowmeter count. If desired, less than all of the flip-flops may be cleared—by omitting $P_2$ and $P_4$ from one or more of the K inputs so that the counters will commence their count with a "live" zero. A greater or lesser number of flip-flop stages may be provided as will be compatible with the duration of pulse $C_t$ and the frequency range of the turbine flowmeter, the prime consideration being that the counters will not overrun while yet not employing so many stages that an excessively long counting interval will be required. Nine flip-flops will give a sensitivity of better than 1 part in 500 which is quite adequate for flow control applications.

The completion of a counting interval is signified by the termination of pulse $C_t$ which, in addition to being sent to time gates F11 and F12, is also sent to inverter gate I10 the output of which is $\overline{C}_t$; signal $\overline{C}_t$ exists when $C_t$ does not, and vice versa. Signal $\overline{C}_t$ is received by reset gate F19 the logic of which is defined by:

$$f^{19} = \overline{C}_t \overline{Q}^{04}(P_1 + P_3)$$

The appearance of signal $\overline{C}_t$, following the generation of pulse $C_t$, signifies completion of a counting interval and activates gate F19. The next clock pulse thereafter will set FF03 up to $Q^{03}$ and the second clock pulse will step the program counter to configuration $P_2$ or $P_4$, as the case may be.

The output register comprises nine magnetically latching relays $R^{P1}, R^{P2} \ldots R^{P9}$ having a set position $r$ and a reset position $\overline{r}$. Count is transferred from counter A or counter B to the register through a register input means which includes a group of readout gates for each of counters A and B. The logic equations for the output register are given by:

$$r^{P1} = P_1 Q^{14} + P_3 Q^{05}$$
$$\overline{r}^{P1} = P_1 \overline{Q}^{14} + P_3 \overline{Q}^{05}$$
$$\vdots$$
$$r^{P9} = P_1 Q^{22} + P_3 Q^{13}$$
$$\overline{r}^{P9} = P_1 \overline{Q}^{22} + P_3 \overline{Q}^{13}$$

Count is transferred from counter B to the register when the program counter is in configuration $P_1$, during a portion of which interval counter A is counting flowmeter pulses. Count is transferred from counter A to the register when the program counter is in configuration $P_3$, during a portion of which interval counter B is counting flowmeter pulses.

Each of relays $R^{P1}, R^{P2} \ldots R^{P9}$ has contacts which in the set position thereof short circuits a corresponding resistor connected with the other resistors in a ladder network which in turn is connected to a source of regulated voltage. The values of the resistors are chosen so that the current flow through the network is numerically equivalent to the digital number stored by the register, thus effecting a digital-to-analog conversion of the register count.

Figure 3:
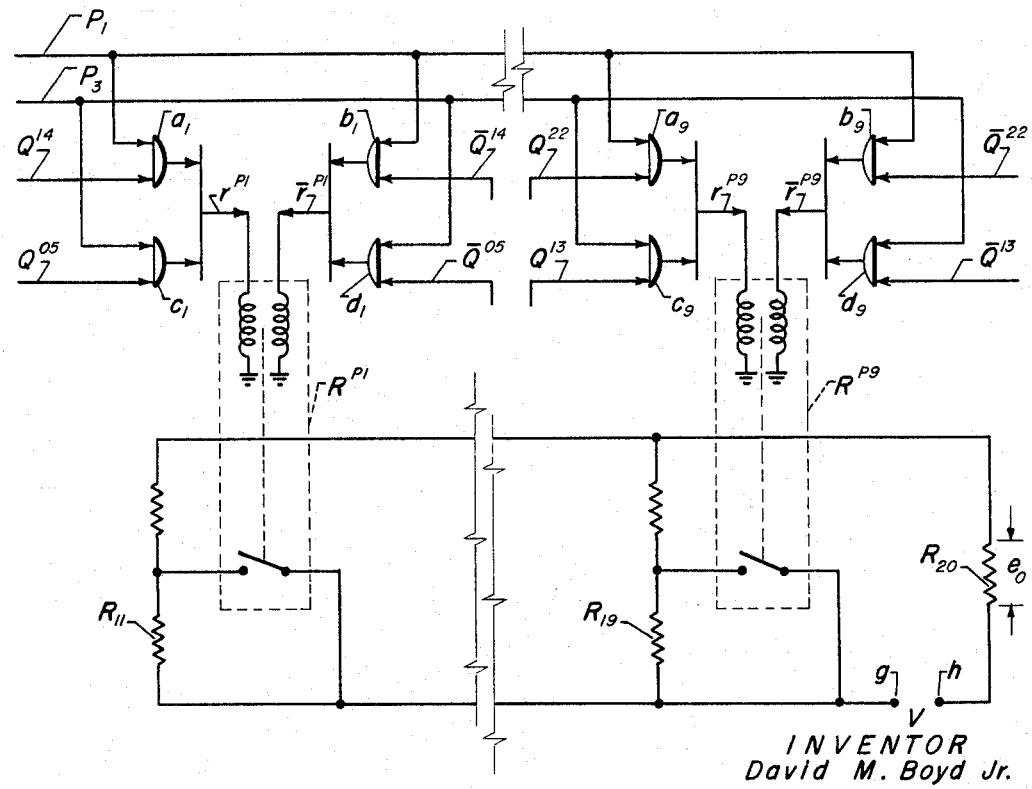
FIGURE 3 is a signal flow-schematic diagram of a suitable output register.

The circuitry of the output register and register input means is illustrated in somewhat more detail in FIGURE 3. A first group of readout gates $a_1, b_1 \ldots a_9, b_9$ is activated when $P_1$ exists, transferring count from counter B to relays $R^{P1} \ldots R^{P9}$; a second group of readout gates $c_1, d_1 \ldots c_9, d_9$ is activated when $P_3$ exists, transferring the count from counter A to relays $R^{P1} \ldots R^{P9}$. Relays $R^{P1} \ldots R^{P9}$, when in a set position, short circuit resistors $R_{11} \ldots R_{19}$ respectively. A regulated voltage V is applied to terminals $g$ and $h$. The current flow through resistor $R_{20}$ will vary in accordance with the state of each of relays $R^{P1} \ldots R^{P9}$, i.e. whether set or reset, so that the output voltage $e_0$, which is applied to the input of amplifier 107, is substantially proportional to the register count. It will be appreciated that instead of relays other bistable storage elements such as a flip-flop register may be employed, if desired, in which case transistor gates receiving corresponding Q signals would be substituted for the relay contacts.

With reference to FIGURE 2a, the C clock comprises a pulse-shaping network including a squaring amplifier and a differentiator. With switch $S^1$ closed and switch $S^2$ open, the C clock receives its excitation from 60-cycle A.C. line frequency which is fast enough for flow control applications, although a higher frequency oscillator may alternatively be employed if desired. With this arrangement, the programming means is driven by constant frequency clock pulses C. The frequency thereof should be less than that of the flowmeter pulses $C_p$ since the latter are used to clear counters A and B. However, it is perfectly feasible to use the variable frequency pulses $C_p$ themselves as stepping signals for the programming means, as by opening switch $S^1$ and closing switch $S^2$. With this latter arrangement the fixed frequency clock may be dispensed with altogether.

The operation of one complete clear-count-readout cycle for each counter is set forth in Table II below. The cycle begins with the program counter in the $P_4$ configuration after clock pulse $L+1$ and ends with the program counter in the $P_3$ configuration after clock pulse $N$. The symbol "X" under a given signal indicates that the signal exists immediately following the clock pulse for that horizontal row, where as a blank space under a given signal indicates that the signal is absent.

TABLE II

| Clock Pulses C | Signals | | | | | | | | | | | | | Counter A | Counter B |
|---|---|---|---|---|---|---|---|---|---|---|---|---|---|---|---|
| | $P_1$ | $P_2$ | $P_3$ | $P_4$ | $Q^{03}$ | $\overline{Q}^{03}$ | $Q^{04}$ | $\overline{Q}^{04}$ | $C_t$ | $f^{11}$ | $f^{12}$ | $\overline{C}_t$ | $f^{19}$ | | |
| L+1 | | | | X | X | | | X | | | | X | | Clear | |
| L+2 | X | | | | | X | X | | | | | X | | | Readout |
| L+3 | X | | | | | X | | X | X | X | | | | Start Count | Readout |
| . | | | | | | | | | | | | | | | |
| . | X | | | | | X | | X | | | | X | X | Stop Count | Readout |
| M | X | | | | X | | | X | | | | X | X | | Readout |
| M+1 | | X | | | X | | | X | | | | X | | | Clear |
| M+2 | | | X | | X | X | | | | | | X | | Readout | |
| M+3 | | | X | | X | | | X | X | | X | | | Readout | Start Count |
| . | | | | | | | | | | | | | | | |
| . | | | X | | | X | | X | | | | X | X | Readout | Stop Count |
| N | | | X | | X | X | | X | | | | X | X | Readout | |
| N+1 | | | | X | X | | | X | | | | X | | Clear | |

Figure 4:
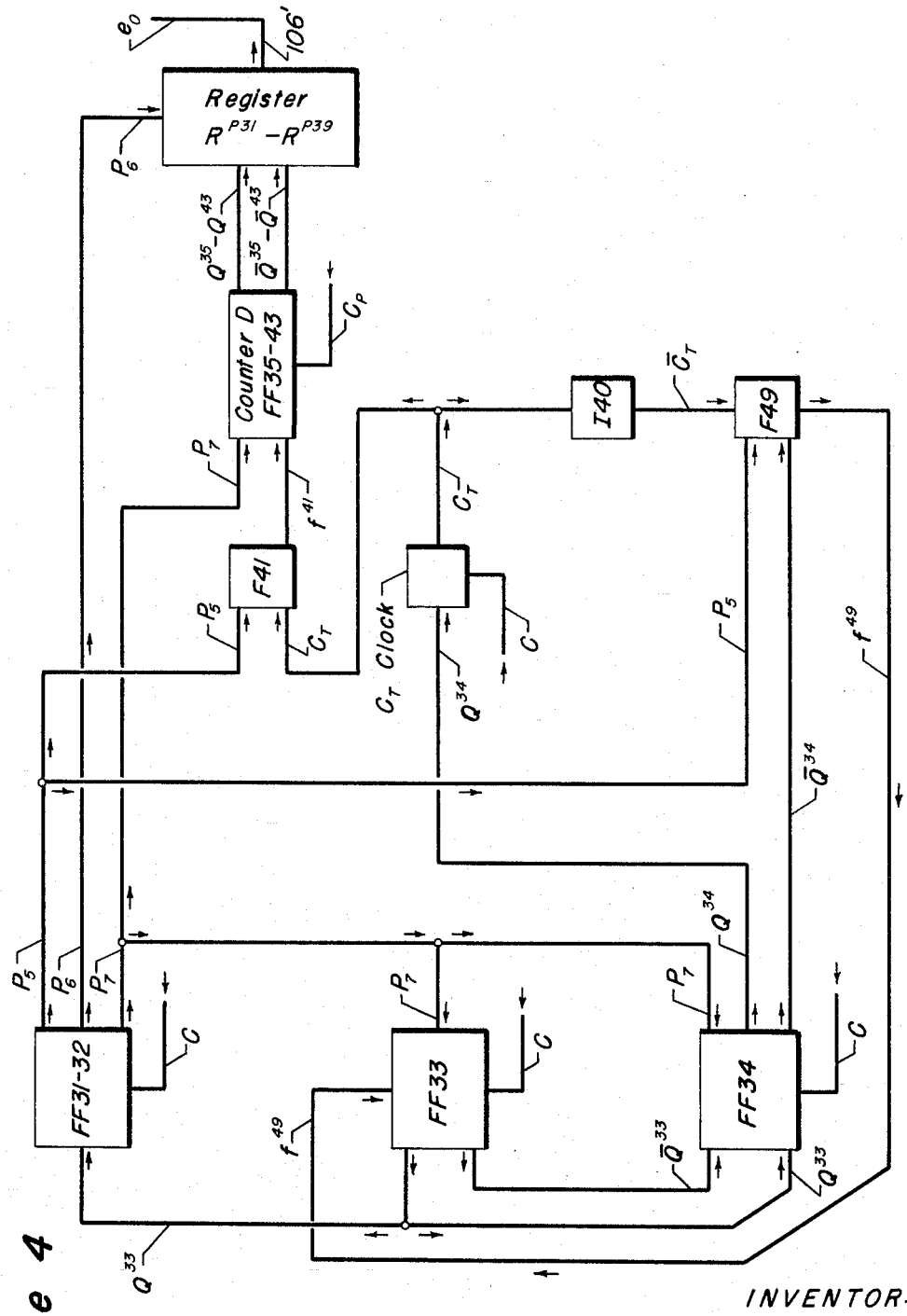
FIGURE 4 is a signal flow diagram of another embodiment of the digital logic section utilizing a single counter.

FIGURE 4 is a schematic signal flow diagram of another, somewhat simpler embodiment of the circuitry contained within block 105 of FIGURE 1 wherein a single counter D is substituted for the dual swinging counters A and B of FIGURE 2. The programming means includes a program counter which comprises two flip-flops FF31 and FF32 and three logical followers $P_5$, $P_6$ and $P_7$, a program counter enabling flip-flop FF33, and a time gate enabling flip-flop FF34. Flip-flops FF31, –32, –33, –34 are driven by clock pulses C from a suitable clock pulse source not illustrated here but similar to that shown in FIGURE 2a.

A single counter D receives flowmeter pulses $C_p$ from line 104.

The program counter controls the steps involved in counting into, reading out and clearing counter D. The logic equations for program counter FF31–32 are given by:

$$J^{31} = \overline{Q}^{31}\overline{Q}^{32}Q^{33}C$$
$$K^{31} = Q^{31}Q^{33}C$$
$$J^{32} = Q^{31}\overline{Q}^{32}Q^{33}C$$
$$K^{32} = \overline{Q}^{31}Q^{32}Q^{33}C$$
$$P_5 = \overline{Q}^{31}\overline{Q}^{32}$$
$$P_6 = Q^{31}\overline{Q}^{32}$$
$$P_7 = \overline{Q}^{31}Q^{32}$$

Signal $Q^{33}$ is obtained from program counter enabling flip-flop FF33. As long as $Q^{33}$ exists, successive clock pulses C will step the program counter successively through its three configurations $P_5$, $P_6$ and $P_7$; however, if $\overline{Q}^{33}$ exists, the program counter is locked in a given configuration. The functions of the three configurations of the program counter are given in Table III:

TABLE III

| Configuration: | Function |
| --- | --- |
| $P_5$ | Count into Counter D. |
| $P_6$ | Read out Counter D. |
| $P_7$ | Clear Counter D. |

Program counter enabling flip-flop FF33 locks the program counter in configuration $P_5$. The logic equations therefor are given by:

$$J^{33} = f^{49}\overline{Q}^{33}C$$
$$K^{33} = P_7 Q^{33}C$$

Signal $f^{49}$ is a reset signal obtained from reset gate F49 signifying completion of a counting interval for counter D. Signal $f^{49}$ plus a clock pulse sets FF33 to $Q^{33}$ which in turn allows the program counter to proceed to configuration $P_6$ upon receiving the second clock pulse thereafter. Flip-flop FF33 will be set down to $\overline{Q}^{33}$ on the same clock pulse which steps the program counter from $P_7$ to $P_5$; the program counter will therefore be locked in configuration $P_5$ to permit a count of flowmeter pulses $C_p$ into counter D as required by Table III.

Time gate enabling flip-flop FF34 provides a signal $Q^{34}$ which readies the $C_t$ clock for generation of an adjustable duration pulse $C_t$ upon receiving the next clock pulse C and also provides a signal $\overline{Q}^{34}$ which prepares reset gate F49 for activation. The FF34 logic is given by:

$$J^{34} = Q^{33}\overline{Q}^{34}P_7 C$$
$$K^{34} = \overline{Q}^{33}Q^{34}C$$

It will be noted that FF34 is set up to $Q^{34}$ by the same clock pulse which sets FF33 down to $\overline{Q}^{33}$. The next clock pulse thereafter returns FF34 to $\overline{Q}^{34}$.

The $C_t$ clock is a univibrator as previously described in connection with FIGURE 2. The logic for the $C_t$ clock is given by:

$$C_t = Q^{34}C$$

The same clock pulse C which sets FF34 down to $\overline{Q}^{34}$ also triggers a single $C_t$ pulse; immediately succeeding clock pulses C will not trigger additional $C_t$ pulses since $Q^{34}$ no longer exists during the remainder of the counting interval.

Time gate F41 permits counter D to count flowmeter pulses $C_p$. Its logic is given by:

$$f^{41} = P_5 C_t$$

Counter D is a binary counter comprising nine flip-flops FF35–43. The logic for counter D is given by:

$$J^{35} = f^{41}\overline{Q}^{35}C_p$$
$$K^{35} = (f^{41}Q^{35} + P_7)C_p$$
$$J^{36} = f^{41}Q^{35}\overline{Q}^{36}C_p$$
$$K^{36} = (f^{41}Q^{35}Q^{36} + P_7)C_p$$
$$J^{37} = f^{41}Q^{35}Q^{36}\overline{Q}^{37}C_p$$
$$K^{37} = (f^{45} + P_7)C_p$$
$$J^{38} = f^{45}\overline{Q}^{38}C_p$$
$$K^{38} = (f^{45}Q^{38} + P_7)C_p$$
$$J^{39} = f^{45}Q^{38}\overline{Q}^{39}C_p$$
$$K^{39} = (f^{45}Q^{38}Q^{39} + P_7)C_p$$
$$J^{40} = f^{45}Q^{38}Q^{39}\overline{Q}^{40}C_p$$
$$K^{40} = (f^{46} + P_7)C_p$$
$$J^{41} = f^{46}\overline{Q}^{41}C_p$$
$$K^{41} = (f^{46}Q^{41} + P_7)C_p$$
$$J^{42} = f^{46}Q^{41}\overline{Q}^{42}C_p$$
$$K^{42} = (f^{46}Q^{41}Q^{42} + P_7)C_p$$
$$J^{43} = f^{46}Q^{41}Q^{42}\overline{Q}^{43}C_p$$
$$K^{43} = (f^{46}Q^{41}Q^{42}Q^{43} + P_7)C_p$$

Signals $f^{45}$ and $f^{46}$ are obtained from logical followers F45 and F46 used in the reduction of counter logic:

$$f^{45} = f^{41}Q^{35}Q^{36}Q^{37}$$
$$f^{46} = f^{41}Q^{35}Q^{36}Q^{37}Q^{38}Q^{39}Q^{40}$$

Signal $P_7$ plus a flowmeter pulse $C_p$ resets counter D to $\overline{Q}^{35}\overline{Q}^{36} \ldots \overline{Q}^{43}$. The counter when thus cleared is prepared to receive the next flowmeter count.

The completion of a counting interval is signified by the termination of pulse $C_t$ which, in addition to being sent to time gate F41, is also sent to inverter gate I40 the output of which is $\overline{C}_t$; $\overline{C}_t$ exists when $C_t$ does not, and vice versa. Signal $\overline{C}_t$ is received by reset gate F49 the logic of which is defined by:

$$f^{49} = \overline{C}_t \overline{Q}^{34} P_5$$

The appearance of signal $\overline{C}_t$, following the generation of pulse $C_t$, signifies completion of a counting interval and activates gate F49. The next clock pulse thereafter will set FF33 up to $Q^{33}$ and the second clock pulse will step the program counter to configuration $P_6$.

The output register comprises nine magnetically latching relays $R^{P31}, R^{P32} \ldots R^{P39}$ having a set position $r$ and a reset position $\bar{r}$. These relays are connected to a resistive ladder network or current tree as has been previously described in connection with FIGURE 3, the count being transferred from counter D to the register through a group of readout gates. The logic equations for the register are given by:

$$r^{P31} = P_6 Q^{35}$$
$$\bar{r}^{P31} = P_6 \overline{Q}^{35}$$
$$\vdots$$
$$r^{P39} = P_6 Q^{43}$$
$$\bar{r}^{P39} = P_6 \overline{Q}^{43}$$

The operation of one clear-count-readout cycle for counter D is set forth in Table IV below. The cycle begins with the program counter in configuration $P_7$ after clock pulse $L+2$ and ends with the program counter in configuration $P_6$ after clock pulse $M+1$. The symbol "X" under a given signal indicates that the signal exists immediately following the clock pulse for that horizontal row, whereas a blank space indicates that the signal does not exist.

TABLE IV

| Clock Pulses C | Signals | | | | | | | | | | | Counter D |
|---|---|---|---|---|---|---|---|---|---|---|---|---|
| | $P_5$ | $P_6$ | $P_7$ | $Q^{33}$ | $\overline{Q}^{33}$ | $Q^{34}$ | $\overline{Q}^{34}$ | $C_t$ | $f^{41}$ | $\overline{C}_t$ | $f^{40}$ | |
| L+2 | | | X | X | | | X | | | X | | Clear |
| L+3 | X | | | | X | X | | | | X | | |
| L+4 | X | | | | | X | | X | X | | | Start Count |
| . | . | . | . | . | . | . | . | . | . | . | . | . |
| | X | | | | X | | X | | | X | X | Stop Count |
| M | X | | | X | | | X | | | X | X | |
| M+1 | | X | | X | | | X | | | X | | Read Out |
| M+2 | | | X | | X | | X | | | X | | Clear |

With the single counter system of FIGURE 4, the time interval between successive counter readouts is 5 clock pulses plus flow-sampling time, while the time interval between successive flow-sampling intervals is 4 clock pulses. With the dual counter system of FIGURE 3, the time interval between successive counter readouts—including the clock pulses which are coextensive with the entire readout period—is 4 clock pulses plus flow-sampling time, while the time interval between successive flow-sampling intervals is 3 clock pulses. The dual counter system is therefore somewhat faster and results in a shorter non-sampling period.

Many variations of this apparatus will suggest themselves to the skilled artisan. For example, the logical circuitry may be constructed partly or wholly of mechanical elements such as relays instead of electronic flip-flops and logical gates. The adjustable duration counting interval may be obtained by means of a time gate counter with selector switch readout to the reset gate, provided that constant frequency clock pulses are employed to drive such time gate counter, instead of utilizing a univibrator. Means may be incorporated into the circuit for operating the flow control loop on manual control, which means may comprise a switch for breaking line 108 and applying a manually adjustable signal $e_c$, obtained from a voltage divider, to the actuating means of valve 109. Means may further be provided for permitting the setpoint of the digital logic section to be reset automatically by a signal from a supervisory controller or on-line digital computer; such cascade control may be effected by inserting a servo-driven variable resistor or slidewire in the RC decay circuit of the univibrator, the servo-motor receiving the signal from the supervisory controller and varying the RC time constant in response thereto. It is intended that the foregoing modifications be included within the scope of the appended claims.

In addition to flow control, the pulse rate controller of this invention may be employed in any regulating system in which the transfer function of the process or operation under control is characterized by fairly small time constants, i.e., such process should have a relatively fast speed of response. Such applications include speed control systems for prime movers such as steam and gas turbines and internal combustion engines, steel rolling mills and the like, in which case the variable frequency pulse source (primary measuring element) may be a tachometer.

I claim as my invention:

1. Apparatus for controlling the pulse rate of a variable frequency pulse source, said frequency being responsive to an analog control signal, which comprises in combination:
    (a) programming means alternately and repetitively producing first and second command pulses which are noncoexistent;
    (b) variable time gating means generating a counter enabling pulse of adjustable time duration in response to said first command pulse;
    (c) a counter adapted to receive and count said variable frequency pulses in response to and only for the duration of said counter enabling pulse;
    (d) register means producing an analog register signal proportional to the total count stored therein;
    (e) register input means for transferring from said counter to the register means, in response to said second command pulse, the total count reached by said counter during the existence of said counter enabling pulse; and
    (f) an integrating amplifier receiving said register signal and producing as its output signal said analog control signal.

2. The apparatus of claim 1 further characterized in that said programming means is driven by a fixed frequency clock pulse source.

3. The apparatus of claim 1 further characterized in that said programming means is driven by said variable frequency pulses.

4. The apparatus of claim 1 further characterized in that said programming means inclues an interlock means responsive to said variable time gating means for inhibiting said second command pulse until termination of said counter enabling pulse.

5. Apparatus for controlling the pulse rate of a variable frequency pulse source, said frequency being responsive to an analog control signal, which comprises in combination:
    (a) programming means alternately and repetitively producing first and second command pulses which are noncoexistent;
    (b) variable time gating means alternately generating first and second counter enabling pulses of adjustable but equal time duration in response, respectively, to said first and second command pulses;
    (c) a first counter adapted to receive and count said variable frequency pulses in response to and only for the duration of said first counter enabling pulse;
    (d) a second counter adapted to receive and count said variable frequency pulses in response to and only for the duration of said second counter enabling pulse;
    (e) register means producing an analog register signal proportional to the total count stored therein;
    (f) first register input means for transferring from said first counter to the register means, in response to said second command pulse, the total count reached by the first counter during the existence of said first counter enabling pulse;
    (g) second register input means for transferring from second counter to the register means, in response to said first command pulse, the total count reached by the second counter during the existence of said second counter enabling pulse; and (h) an integrating amplifier receiving said register signal and producing as its output signal said analog control signal.

6. The apparatus of claim 5 further characterized in that said programming means includes an interlock means responsive to said variable time gating means for inhibiting said second command pulse until termination of said first counter enabling pulse and for inhibiting said first command pulse until termination of said second counter enabling pulse.

7. The apparatus of claim 5 further characterized in that said amplifier is an error amplifier also receiving a bias signal, the output thereof being approximately proportional to the time integral of the difference between said register signal and the bias signal.

References Cited by the Examiner

UNITED STATES PATENTS 2,907,021 9/1959 Woods _____ 235—154 X
3,048,331 8/1962 Van Nice et al. _____ 235—151

MAYNARD R. WILBUR, *Primary Examiner.*

MALCOLM A. MORRISON, *Examiner.*

D. M. ROSEN, W. J. KOPACZ, *Assistant Examiners.*